(12) United States Patent  
Nakata

(10) Patent No.: US 10,742,890 B2  
(45) Date of Patent: Aug. 11, 2020

(54) IMAGING APPARATUS, IMAGING SYSTEM, MOVING BODY, AND IMAGING METHOD

(71) Applicant: KYOCERA Corporation, Kyoto (JP)

(72) Inventor: Takatoshi Nakata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/345,636

(22) PCT Filed: Oct. 18, 2017

(86) PCT No.: PCT/JP2017/037678  
§ 371 (c)(1),  
(2) Date: Apr. 26, 2019

(87) PCT Pub. No.: WO2018/079372  
PCT Pub. Date: May 3, 2018

(65) Prior Publication Data  
US 2019/0273858 A1 Sep. 5, 2019

(30) Foreign Application Priority Data

Oct. 28, 2016 (JP) ................. 2016-212325

(51) Int. Cl.
*H04N 7/18* (2006.01)
*H04N 5/235* (2006.01)
*H04N 5/225* (2006.01)
*H04N 5/265* (2006.01)
*H04N 9/04* (2006.01)
(Continued)

(52) U.S. Cl.  
CPC ........... *H04N 5/2352* (2013.01); *G03B 15/00* (2013.01); *G03B 15/02* (2013.01); *G03B 15/05* (2013.01); *G03B 17/02* (2013.01); *H04N 5/225* (2013.01); *H04N 5/2256* (2013.01); *H04N 5/232* (2013.01); *H04N 5/2351* (2013.01); *H04N 5/265* (2013.01); *H04N 7/18* (2013.01); *H04N 9/04* (2013.01); *H04N 9/045* (2013.01); *H04N 9/68* (2013.01); *H04N 9/77* (2013.01)

(58) Field of Classification Search  
CPC ..................................... H04N 5/2352  
USPC ........................................... 348/146  
See application file for complete search history.

(56) References Cited

U.S. PATENT DOCUMENTS 8,659,406 B2 2/2014 Usami  
9,338,371 B2 5/2016 Sano et al.  
(Continued)

FOREIGN PATENT DOCUMENTS

JP 2006-013884 A 1/2006  
JP 2008-299538 A 12/2008  
(Continued)

*Primary Examiner* — Leron Beck  
(74) *Attorney, Agent, or Firm* — Studebaker & Brackett PC

(57) ABSTRACT

An imaging apparatus includes an image sensor and a controller. The controller acquires an infrared image generated by the image sensor when infrared light is higher than a predetermined light amount. The controller acquires a normal image generated by the image sensor when the infrared light is lower than the predetermined light amount. The controller generates a synthesized image on the basis of the infrared image and the normal image. Thus, an image that includes colors and high luminance contrast may be generated in a dark environment without a plurality of infrared light sources.

13 Claims, 6 Drawing Sheets

(51) Int. Cl.
*H04N 9/68* (2006.01)
*H04N 9/77* (2006.01)
*G03B 15/05* (2006.01)
*G03B 15/00* (2006.01)
*G03B 17/02* (2006.01)
*H04N 5/232* (2006.01)
*G03B 15/02* (2006.01)

(56) References Cited

U.S. PATENT DOCUMENTS

| | | | |
|---|---|---|---|
| 2007/0201738 A1* | 8/2007 | Toda | H04N 9/045 |
| | | | 382/144 |
| 2008/0297374 A1 | 12/2008 | Usami | |
| 2008/0315104 A1 | 12/2008 | Nam | |
| 2010/0019151 A1 | 1/2010 | Shimizu | |
| 2010/0103268 A1 | 4/2010 | Tokuyama | |
| 2011/0235017 A1* | 9/2011 | Iwasaki | H04N 5/2354 |
| | | | 356/4.01 |
| 2013/0229513 A1* | 9/2013 | Ichitani | G02B 27/1066 |
| | | | 348/135 |
| 2014/0192202 A1 | 7/2014 | Sano et al. | |
| 2015/0042774 A1* | 2/2015 | Sugano | H04N 5/2256 |
| | | | 348/68 |
| 2015/0055886 A1* | 2/2015 | Oh | G06T 3/4038 |
| | | | 382/284 |
| 2015/0163418 A1* | 6/2015 | Chen | H04N 5/332 |
| | | | 348/164 |
| 2016/0139039 A1* | 5/2016 | Ikehara | H04N 5/332 |
| | | | 348/46 |
| 2016/0330385 A1 | 11/2016 | Sekiguchi et al. | |
| 2017/0237887 A1 | 8/2017 | Tanaka et al. | |
| 2018/0330160 A1 | 11/2018 | Yamamoto et al. | |

FOREIGN PATENT DOCUMENTS

| | | |
|---|---|---|
| JP | 2010-103740 A | 5/2010 |
| JP | 2011-119917 A | 6/2011 |
| JP | 2014-135627 A | 7/2014 |
| JP | 2015-149585 A | 8/2015 |
| JP | 2016-096430 A | 5/2016 |
| JP | 2017-097645 A | 6/2017 |
| WO | 2014/192876 A1 | 12/2014 |

* cited by examiner

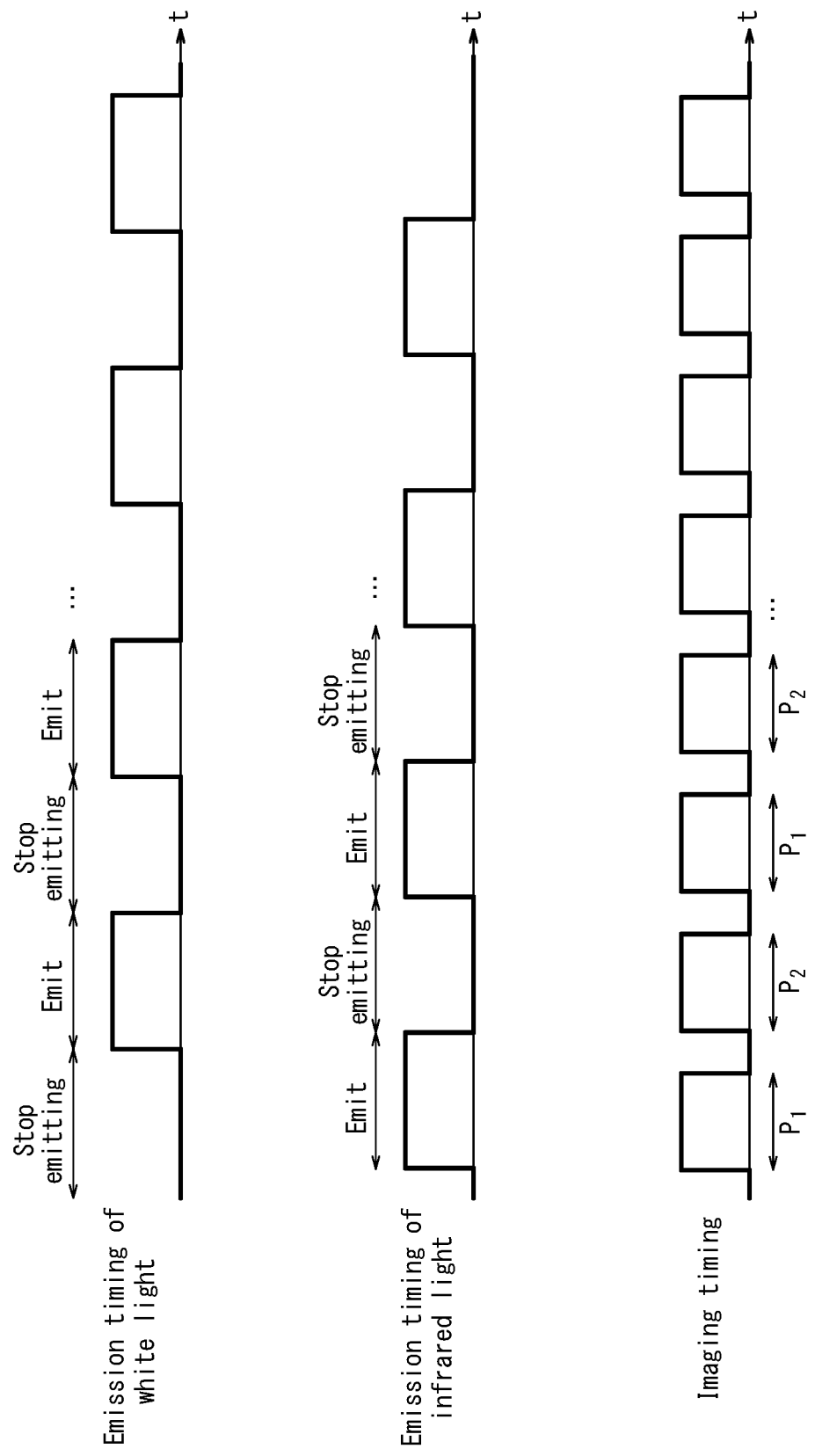

IMAGING APPARATUS, IMAGING SYSTEM, MOVING BODY, AND IMAGING METHOD

CROSS REFERENCE TO RELATED APPLICATION

This application claims priority to and the benefit of Japanese Patent Application No. 2016-212325 filed on Oct. 28, 2016, the entire contents of which are incorporated herein by reference.

TECHNICAL FIELD

The present disclosure relates to an imaging apparatus, an imaging system, a moving body, and an imaging method.

BACKGROUND

When imaging in a dark environment such as at night, it is conventionally known to capture a subject by irradiating the subject with infrared light in order to better identify the subject in a captured image. However, when a subject illuminated with infrared light is imaged, the color of the subject, which would be visible to the human eye in a bright environment, cannot be satisfactorily reproduced in the imaged image.

As such, a conventional imaging apparatus is configured to reproduce the color of a subject in an environment with a small amount of visible light. The conventional imaging apparatus is configured to sequentially emit infrared light of different wavelengths respectively associated with red, blue, and green. This imaging apparatus is configured to generate a synthesized image on the basis of images captured when the respective infrared light are emitted.

SUMMARY

Solution to Problem

An imaging apparatus according to the present disclosure includes an image sensor and a controller. The controller acquires an infrared image generated by the image sensor when infrared light is higher than a predetermined light amount. The controller acquires a normal image generated by the image sensor when the infrared light is lower than the predetermined light amount. The controller generates a synthesized image on the basis of the infrared image and the normal image.

An imaging system according to the present disclosure includes an infrared light source and an imaging apparatus. The infrared light source is configured to emit infrared light. The imaging apparatus includes an image sensor and a controller. The controller is configured to acquire an infrared image generated by the image sensor when the infrared light is higher than a predetermined light amount. The controller is configured to acquire a normal image generated by the image sensor when the infrared light is lower than the predetermined light amount. The controller generates a synthesized image on the basis of the infrared image and the normal image.

A moving body according to the present disclosure includes an imaging system. The imaging system includes an infrared light source and an imaging apparatus. The infrared light source is configured to emit infrared light. The imaging apparatus includes an image sensor and a controller. The controller acquires an infrared image generated by the image sensor when the infrared light is higher than a predetermined light amount. The controller acquires a normal image generated by the image sensor when the infrared light is lower than the predetermined light amount. The controller generates a synthesized image on the basis of the infrared image and the normal image.

An imaging method according to the present disclosure is an imaging method of an imaging apparatus. The imaging apparatus acquires an infrared image captured by an image sensor when infrared light is higher than a predetermined light amount. The imaging apparatus acquires a normal image captured by the image sensor when the infrared light is lower than the predetermined light amount. The imaging apparatus generates a synthesized image on the basis of the infrared image and the normal image.

BRIEF DESCRIPTION OF THE DRAWINGS

In the accompanying drawings:

FIG. 6 is a timing chart illustrating example timing of operations of the infrared light source, the white light source, and the imaging apparatus according to another example.

DETAILED DESCRIPTION

According to the conventional technique described above, it is necessary to include a plurality of infrared light sources for emitting infrared light having different wavelengths. As a result, a problem exists in that the size of the imaging apparatus is increased.

The present disclosure provides an imaging system, a moving body, and an imaging method having a simple configuration capable of generating an image that includes colors and has high brightness contrast even in a dark environment.

According to an embodiment of the present disclosure, it is possible to generate an image that includes color and has high brightness contrast even in a dark environment.

Hereinafter, an embodiment of the present disclosure will be described with reference to the accompanying drawings.

Figure 1:
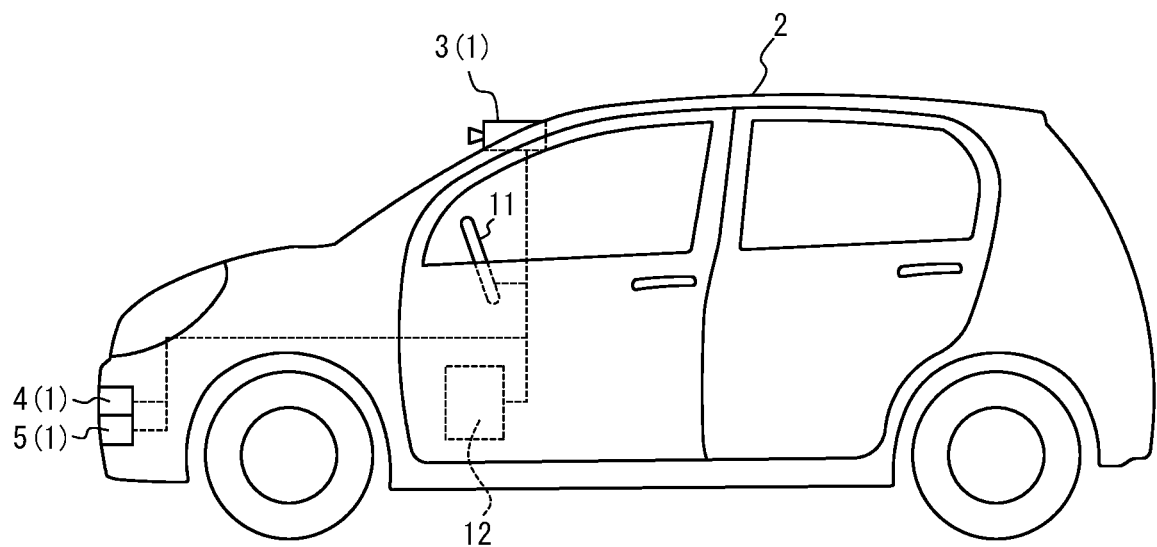
FIG. 1 is a diagram illustrating an example of a moving body equipped with an imaging system according to an embodiment.

As illustrated in FIG. 1, an imaging system 1 that includes an imaging apparatus 3 according to the present embodiment can be mounted on a moving body 2. The imaging apparatus 3 is positioned to capture an image in a predetermined direction viewed from the moving body 2. An infrared light source 4 and a white light source 5 are mounted in such a manner as to be able to emit infrared light and white light, respectively, within an imaging range of the imaging apparatus 3.

The term "moving body" as used herein encompasses vehicles, ships, and aircrafts. The term "vehicle" as used herein encompasses, but is not limited to, automobiles, rail vehicles, industrial vehicles, and domestic vehicles. For example, vehicles may include aircraft that travel on a runway. Automobiles may include, but are not limited to, cars, trucks, buses, motorcycles, trolley buses, and other automobiles that travel on a road. Guideway vehicles may include, but are not limited to, locomotives, freight cars, passenger cars, trams, guided railways, ropeways, cable cars, linear motor trains, and monorails. Guided railways may include other types of vehicles that travel along a track. Industrial vehicles include agricultural vehicles and construction vehicles. Industrial vehicles include vehicles for agricultural purposes and vehicles for industrial purposes. Industrial vehicles for industrial purposes include, but are not limited to, forklifts and golf carts. Industrial vehicles for agricultural purpose include, but are not limited to, tractors, tillers, transplanters, binders, combine harvesters, and lawn mowers. Industrial vehicles for construction purposes include, but are not limited to, bulldozers, scrapers, excavators, crane trucks, dump trucks, and load rollers. Domestic vehicles include, but are not limited to, bicycles, wheelchairs, strollers, wheelbarrows, and electric stand-up motorcycles. Engines for powering the vehicles include, but are not limited to, diesel engines, gasoline engines, internal-combustion engines including hydrogen engines, and electric engines including motors. The vehicles include those that travel under human power. Classification of the vehicles is not limited to the above. For example, the vehicles may include industrial vehicles authorized to travel on the road. A plurality of categories may include the same type of vehicles.

Figure 2:
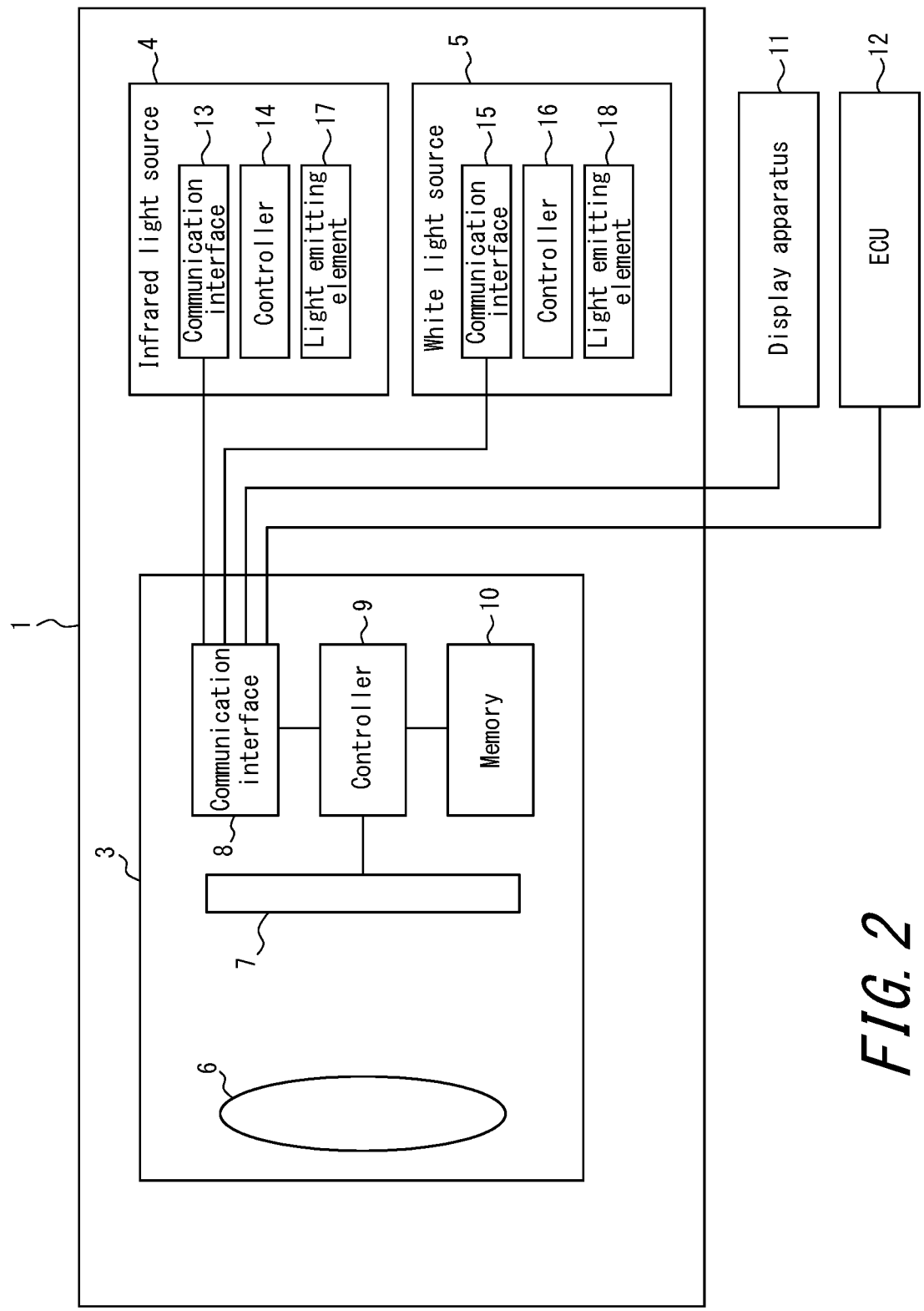
FIG. 2 is a functional block diagram schematically illustrating a configuration of the imaging system according to the embodiment.

As illustrated in FIG. 2, the imaging system 1 includes the imaging apparatus 3, the infrared light source 4, and the white light source 5.

The imaging apparatus 3 includes an optical system 6, an image sensor 7, a communication interface 8, a controller 9, and a memory 10.

The optical system 6 includes at least one optical element such as a lens, an aperture and the like matched to a desired optical property. The optical system 6 is designed to satisfy the desired optical property such as a focal length and a focal depth. The optical system 6 forms an image of a subject on the image sensor 7.

The image sensor 7 is positioned such that a light receiving surface of the image sensor 7 is perpendicular to an optical axis of the optical system 6. The image sensor 7 is arranged such that the optical axis of the optical system 6 crosses substantially at the center of the light receiving surface.

The image sensor 7 captures an image of the subject formed on the light receiving surface via the optical system 6 and outputs an image signal corresponding to the captured image. The image sensor 7 may be, for example, a CCD (Charge Coupled Device) image sensor or a CMOS (Complementary Metal Oxide Semiconductor) image sensor.

The image sensor 7 is sensitive at least to visible light and near infrared light and converts the visible light and the near infrared light received by the light receiving surface into an image signal. When the image sensor 7 is sensitive to infrared light of a wavelength longer than the wavelength of the near infrared light, a filter configured to absorb or reflect the infrared light of the wavelength longer than the wavelength of the near infrared light may be disposed on the object side of the image sensor 7.

The communication interface 8 transmits a control signal output by the controller 9 to the infrared light source 4. The control signal is a signal for controlling the infrared light source 4 to emit infrared light higher or lower than a predetermined light amount. By turning on the infrared light, the infrared light becomes higher than the predetermined light amount. By switching off the infrared light, the infrared light becomes lower than the predetermined light amount.

The communication interface 8 can transmit the image signal externally from the imaging apparatus 3. Thus, the communication interface 8 can transmit a synthesized image generated by the controller 9 externally from the imaging apparatus 3. The synthesized image is transmitted to, for example, a display apparatus 11 mounted in the moving body 2, an ECU (Electric Control Unit) 12 of the moving body 2, or an apparatus external to the moving body 2 connected via wireless communication network.

The controller 9 is, for example, an ISP (Image Signal Processor) configured to acquire and process the image captured by the image sensor 7.

The memory 10 stores the image acquired by the controller 9 from the image sensor 7. The memory 10 also stores the image processed by the controller 9.

The infrared light source 4 emits infrared light. An irradiation range of the infrared light source 4 corresponds to a part of an irradiation range of the white light source 5, which will be described later. The infrared light source 4 includes a communication interface 13, a controller 14, and a light emitting element 17.

The communication interface 13 exchanges signals with an external apparatus. The controller 14 causes the light emitting element 17 to emit and stop emitting the infrared light. The light emitting element 17 emits and does not emit the infrared light on the basis of the control of the controller 14. The light emitting element 17 is attached to the moving body 2 in such a manner as to be able to irradiate at least a part of the imaging range of the image sensor 7 with the infrared light.

The white light source 5 emits white light. The white light source 5 includes a communication interface 15, a controller 16, and a light emitting element 18.

The communication interface 15 exchanges signals with an external apparatus. The controller 16 causes the light emitting element 18 to emit and stop emitting the white light.

The light emitting element 18 emits and stops emitting white light on the basis of control by the controller 16. The light emitting element 18 is attached to the moving body 2 in such a manner so as to be able to irradiate at least a part of the imaging range of the image sensor 7 with the white light.

The white light source 5 is attached to the moving body 2. The white light source 5 may be a so-called headlight. The white light source 5 can switch between two irradiation ranges for irradiating the white light. The two irradiation ranges are different at least in a direction vertical to a road surface. An irradiation range in a vertically lower range corresponds to a "first irradiation range", and an irradiation range in a vertically upper range corresponds to a "second irradiation range" that includes a range vertically above the first irradiation range. When the white light source 5 irradiates the vertically lower range, the white light emitted from the white light source 5 is a so-called low beam. When the white light source 5 irradiates the vertically upper range, the white light emitted from the white light source 5 is a so-called high beam.

Next, the imaging apparatus 3 will be described in detail.

The image sensor 7 generates an image by capturing a subject in a direction in which the infrared light source 4 can emit infrared light and the white light source 5 can emit white light.

The controller 9 causes the image sensor 7 to capture an image at each frame imaging time. Thus, the image sensor 7 generates an image of one frame by imaging the subject at a frame imaging time corresponding to a preset frame rate.

Figure 3:
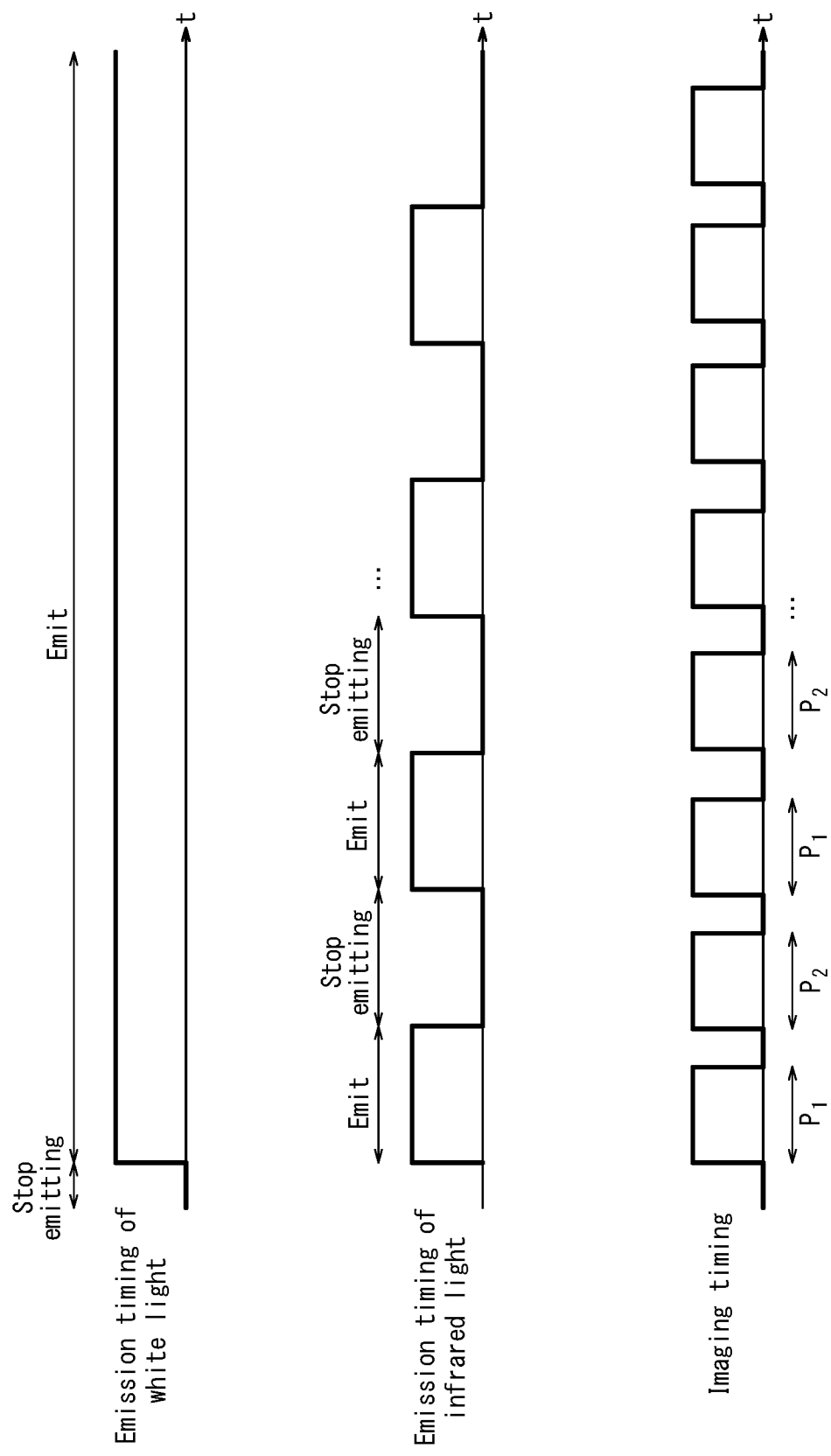
FIG. 3 is a timing chart illustrating an example timing of operations of an infrared light source, a white light source, and an imaging apparatus.

The controller 9 transmits a control signal in synchronization with the frame imaging time to the infrared light source 4 via the communication interface 8. In particular, the controller 9 transmits the control signal for causing the infrared light source 4 to emit infrared light in a period $P_1$ as illustrated in FIG. 3. The controller 9 causes the image sensor 7 to generate an image in the period $P_1$. The controller 9 transmits a control signal for causing the infrared light source 4 to stop emitting infrared light in a frame imaging time (period $P_2$) subsequent to the frame imaging time corresponding to the period $P_1$. The period $P_1$ and the period $P_2$ correspond to "first period" and "second period", respectively. Similarly, the controller 9 transmits a control signal for causing the infrared light source 4 to emit infrared light in the next frame imaging time (period $P_1$). As described above, the controller 9 alternately transmits the control signals for causing the infrared light source 4 to start and stop emission of infrared light, in a manner corresponding to the frame imaging times in the period $P_1$ and the period $P_2$ repeated alternatively. The communication interface 13 of the infrared light source 4 receives the control signals transmitted from the imaging apparatus 3. The controller 14 of the infrared light source 4 causes starting and stopping of the emission on the basis of the control signals received by the communication interface 13.

In this way, emission of infrared light is alternatively started and stopped in a repeating manner in synchronization with the frame imaging times corresponding to the frame rate of the imaging apparatus 3. In particular, infrared light is emitted in one frame imaging time and stopped in the subsequent frame imaging time. The starting and stopping of emission of infrared light as described above is performed repeatedly.

During an imaging process according to the present embodiment, the controller 9 transmits a control signal for emitting the white light at all times to the white light source 5 via the communication interface 8. The communication interface 15 of the white light source 5 receives the control signal transmitted from the imaging apparatus 3. The controller 16 of the white light source 5 causes emission of the white light on the basis of the control signal received by the communication interface 15. Thus, the white light is emitted at all times as illustrated in FIG. 3.

The controller 9 receives an image captured by the image sensor 7 when infrared light is emitted or not emitted. An image captured when infrared light is emitted corresponds to an "infrared image", and an image captured when infrared light is not emitted corresponds to a "normal image".

The controller 9 generates a synthesized image on the basis of the infrared image and the normal image acquired from the image sensor 7. In particular, the controller 9 calculates an intensity of a luminance signal Y from a pixel signal of each of the pixels constituting the infrared image. The controller 9 also calculates intensities of color difference signals Cb and Cr from the pixel signal of each of the pixels constituting the normal image. Then, the controller 9 generates color signals by using the luminance signal Y of each of the pixels and the color difference signals Cb and Cr of corresponding pixels.

The controller 9 may perform gain correction on the color difference signals Cb and Cr when generating the synthesized image. In particular, the controller 9 performs the gain correction on the basis of the intensity of the luminance signal Y and the intensities of the color difference signals Cb and Cr. For example, the controller 9 calculates a value based on the intensities of the luminance signals Y of all the pixels constituting the infrared image. The value based on the intensities of the luminance signals Y of all the pixels is, for example, a representative value $Y_r$ (a statistical value of the mean, median, and maximum values) of the luminance signals Y. The controller 9 also calculates a value based on the color difference signals Cb and Cr of all the pixels constituting the normal image. The values based on the color difference signals Cb and Cr of all the pixels are, for example, representative values $Cb_r$ and $Cr_r$ (statistical values of the mean, median, and maximum values) of the respective intensities the color difference signals Cb and Cr.

In this case, the controller 9 calculates gains to multiply the color difference signals Cb and Cr of each pixel such that a difference between the mean value of the representative values $Cb_r$ and $Cr_r$ and the representative value $Y_r$ or a ratio of the mean value of the representative values $Cb_r$ and $Cr_r$ to the representative value $Y_r$ fall within a predetermined range. The controller 9 multiplies the color difference signals Cb and Cr of each pixel by the calculated gains. The controller 9 generates the color signals on the basis of the luminance signal Y of each pixel and corresponding corrected color difference signals Cb1 and Cr1 of each pixel.

Although it has been described that the controller 9 calculates the representative values $Y_r$, $Cb_r$, and $Cr_r$ on the basis of all of the pixels constituting the infrared image and the normal image, the controller 9 may calculate the representative values $Y_r$, $Cb_r$, and $Cr_r$ on the basis of some of the pixels constituting the infrared image and the normal image.

Figure 4:
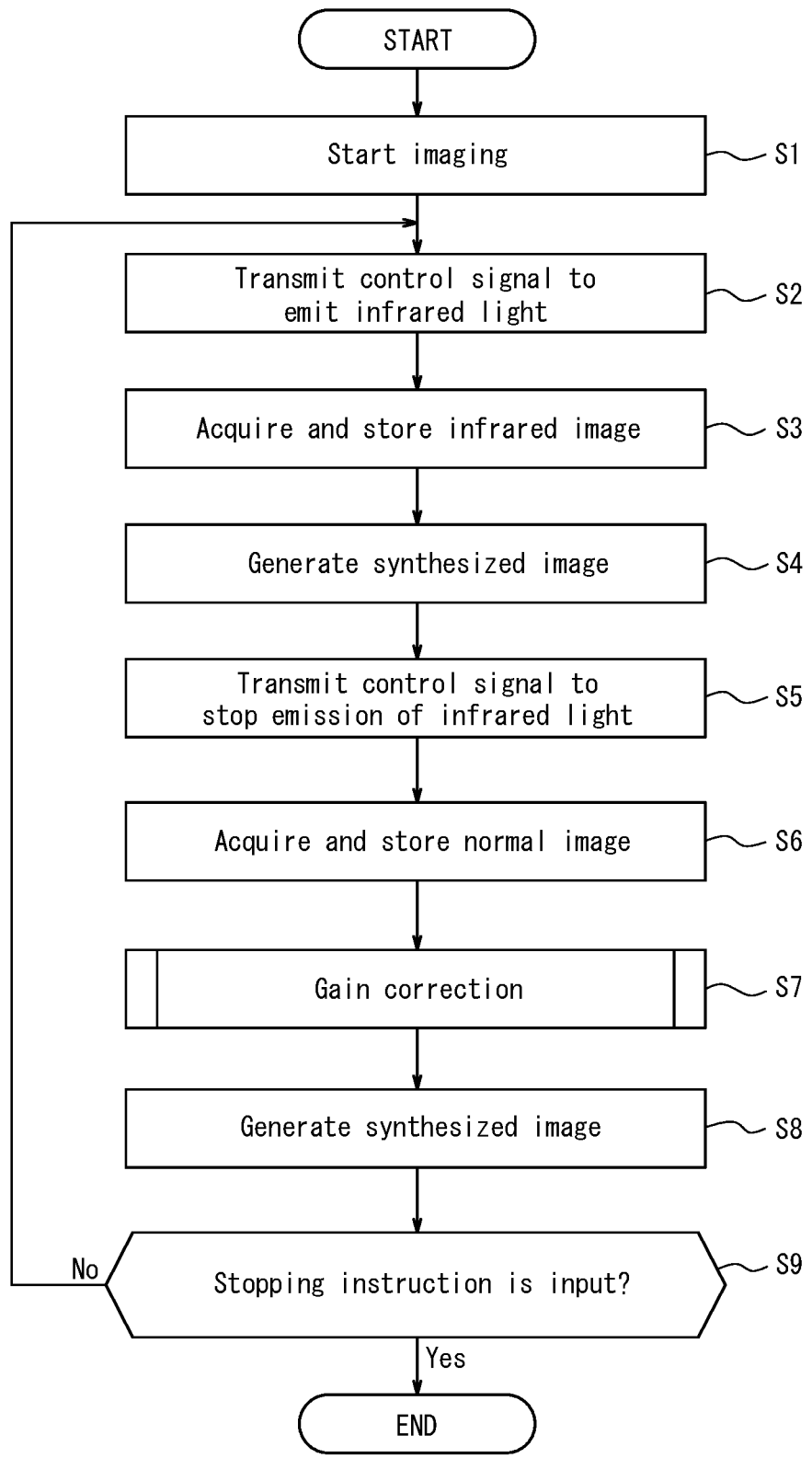
FIG. 4 is a flowchart illustrating a processing flow of the imaging apparatus according to the embodiment.

Next, an imaging method of the imaging apparatus 3 according to the present embodiment will be described with reference to FIG. 4. The imaging apparatus 3 starts processing when the white light source 5 starts emitting white light. The white light source 5 starts emitting white light upon receiving an instruction to start the operation from a user of the imaging system 1. The white light source 5 may start emitting white light when controlled by the ECU which detects that it is dark in the environment based on a light sensor.

First, the controller 9 causes the image sensor 7 to start imaging (step S1). That is, the controller 9 causes the image sensor 7 to capture images in succession according to the preset frame rate.

The controller 9 transmits the control signal to emit infrared light to the infrared light source 4 via the communication interface 8 (step S2).

The controller 9 acquires the infrared image captured when infrared light is emitted on the basis of the control signal transmitted in step S2 and stores the infrared image in the memory 10 (step S3).

The controller 9 generates the synthesized image on the basis of the luminance signal Y of the infrared image stored in the memory 10 in step S3 and the corrected color difference signals Cr1 and Cb1 of the normal image captured most recently among the normal images already stored in the memory 10 (step S4).

Subsequently, the controller 9 transmits the control signal for stopping the emission of infrared light to the infrared light source 4 via the communication interface 8 in synchronization with the next frame imaging time (step S5).

When the control signal is transmitted in step S5, the controller 9 acquires the normal image captured when the infrared light is not emitted on the basis of the control signal transmitted in step S5 and stores the normal image in the memory 10 (step S6).

The controller 9 performs the gain correction on the color difference signals Cr and Cb of the normal image acquired in step S6 (step S7).

Figure 5:
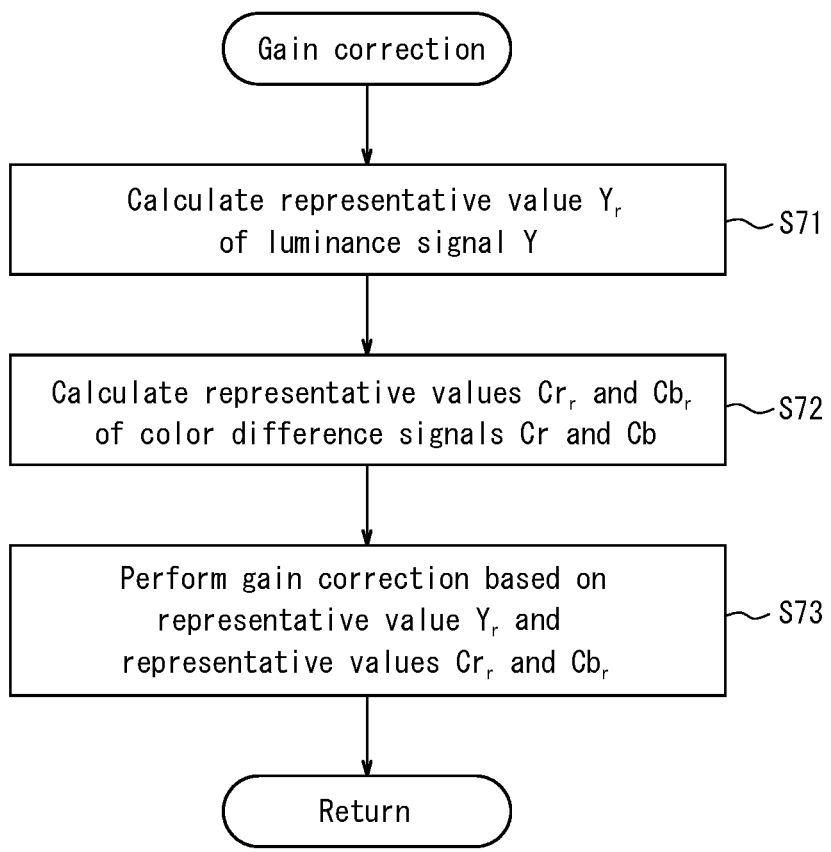
FIG. 5 is a flowchart illustrating a detailed processing flow of gain correction according to the embodiment.

Here, the gain correction performed by the controller 9 will be described in detail with reference to FIG. 5.

First, the controller 9 calculates the representative value $Y_r$ of the intensity of the luminance signal Y of the infrared image that is acquired immediately before the normal image is acquired in step S5 and stored in the memory 10 (step S71).

The controller 9 calculates the representative values $Cr_r$ and $Cb_r$ of the intensities of the color difference signals Cr and Cb of the normal image acquired in step S5 (step S72). The processing of step S72 may be performed before the processing of step S71.

The controller 9 generates the corrected color difference signals Cr1 and Cb1 by performing the gain correction on the color difference signals Cr and Cb of each pixel on the basis of the representative value $Y_r$ and the representative values $Cr_r$ and $Cb_r$ (step S73). In particular, for example, the controller 9 may calculate the gains for multiplying the intensities of the color difference signals Cb and Cr of each pixel such that the difference between the mean value of the representative values $Cr_r$ and $Cb_r$ and the representative value $Y_r$ or the ratio of the mean value of the representative values $Cr_r$ and $Cb_r$ to the representative value $Y_r$ falls within the predetermined range. Then, the controller 9 multiplies the intensities of the color difference signals Cb and Cr of each pixel by the gains.

Returning to FIG. 4, when the gain correction is performed in step S7, the controller 9 generates the synthesized image on the basis of the corrected color difference signals Cr1 and Cb1 of the normal image and the luminance signal Y of the infrared image among the infrared images already stored in the memory 10 that is captured immediately beforehand (step S8).

After transmitting the synthesized image in step S8, the controller 9 determines whether a stopping instruction is input in respect of the imaging apparatus 3 (step S9).

When the controller 9 determines that the stopping instruction is input, the imaging apparatus 3 stops the operation. When the controller 9 determines that the stopping instruction is not input, the controller 9 returns to step S2 and transmits the control signal. Then, the controller 9 repeats step S2 to step S9.

According to the present embodiment, the imaging apparatus 3 generates an image on the basis of an infrared image and a normal image. In particular, the imaging apparatus 3 generates a synthesized image that includes the luminance signal Y of the infrared image and the color difference signals Cb and Cr of the normal image. The infrared light has higher reflectivity from a subject than the white light even in a dark environment. Thus, the controller 9 can acquire, from the infrared image, the luminance signal Y of higher intensity and larger contrast than that of the normal image. The controller 9 can acquire the color difference signals Cr and Cb from the normal image. Accordingly, the imaging apparatus 3 can generate, on the basis of the luminance signal Y, an image having a low S/N ratio and high contrast including colors based on the color difference signals Cb and Cr even in a dark environment such as at night.

According to the present embodiment, the imaging apparatus 3 performs the gain correction only in respect of the color difference signals Cb and Cr of the normal image. Because the overall intensity of the pixel signals is low in a dark environment, the intensities of the color difference signals Cb and Cr are relatively low, and the color of the synthesized image may become dull. However, the gain correction can increase the intensities of the color difference signals Cb and Cr, and thus color tones can be reproduced strongly. Because the gain correction is not performed in respect of the luminance signal Y, whitening of the entire image can be prevented. Accordingly, the imaging apparatus 3 can generate an image with high brightness contrast and vivid colors.

According to the present embodiment, the infrared light source 4 emits the infrared light as a high beam. To avoid dazzling a user of an oncoming moving body or a user of a moving body running ahead, most drivers typically emit the white light emitted from the white light source 5 as the low beam. The human eye does not sense the infrared light. Thus, the imaging apparatus 3 can cause the infrared light source 4 to emit the infrared light without dazzling the users, and capture a subject in a detectable manner.

According to the present embodiment, the white light source 5 emits the white light at all times. This offers an advantage that the user of the imaging system 1 will not have a sense of discomfort caused by flashing as the white light is turned off when the infrared light is turned on and turned on when the infrared light is turned off.

Although the above embodiment has been described as a representative example, it should be appreciated that a number of modifications and alterations may be realized within the spirit and scope of the present disclosure. Accordingly, the present disclosure should not be construed as being limited to the embodiment and examples described above, but may be varied or modified in a number of manners without departing from the scope of the appended claims. For example, a plurality of constituent blocks described in the embodiment or examples may be combined together, or one constituent block may be subdivided.

For example, although it has been described that the controller 9 transmits the control signals for controlling the emission of infrared light by the infrared light source 4 via the communication interface 8, this is not restrictive. For example, the controller 9 may receive an emission state signal indicating an emission state of the infrared light from the infrared light source 4 via the communication interface 8. The emission state signal is a signal indicating that the infrared light is emitted or a signal indicating that the infrared light is not emitted.

In this case, when the controller 9 receives the emission state signal indicating that the infrared light is emitted from the infrared light source 4, the controller 9 acquires the image generated by the image sensor 7 when the infrared light is emitted as the infrared image. Also, when the communication interface 8 receives the emission state signal indicating that the infrared light is not emitted from the infrared light source 4, the controller 9 acquires the image generated by the image sensor 7 when the infrared light is not emitted as the normal image.

In an example variation, the white light source 5 may stop emitting the white light when the infrared light source 4 emits the infrared light, and emit the white light when the infrared light source 4 does not emit the infrared light, as illustrated in FIG. 6. In this case, preferably, the emission and the stopping of the emission of the white light are repeated at a high speed which cannot be recognized by the human eye. In this way, discomforting the human by emitting and stopping the emission of the light in succession can be avoided.

Although it has been described that the controller 9 calculates the gains by using both the representative value Cb$_r$ and the representative value Cr$_r$, this is not restrictive. For example, the controller 9 may use one of the representative value Cb$_r$ and the representative value Cr$_r$ for calculating a gain for correcting the corresponding one of the color difference signal Cb or the color difference signal Cr. The gain calculation method of the controller 9 may be appropriately determined according to characteristics of the synthesized image required by the user according to the usage.

REFERENCE SIGNS LIST

1 imaging system
2 moving body
3 imaging apparatus
4 infrared light source
5 white light source
6 optical system
7 image sensor
8, 13, 15 communication interface
9, 14, 16 controller
10 memory
11 display apparatus
12 ECU
17, 18 light emitting element

The invention claimed is:

1. An imaging apparatus comprising:
an image sensor; and
a controller configured to acquire an infrared image generated by the image sensor when infrared light is higher than a predetermined light amount, to acquire a normal image generated by the image sensor when the infrared light is lower than the predetermined light amount, and to generate a synthesized image on the basis of the infrared image and the normal image,
wherein the controller is configured to cause an infrared light source to increase the infrared light to be higher than the predetermined light amount in a first period, and to reduce the infrared light to be lower than the predetermined light amount in a second period different from the first period.

2. The imaging apparatus according to claim 1,
wherein the controller is configured to receive an emission state signal indicating an emission state of the infrared light from an infrared light source, and on the basis of the emission state signal, to acquire the infrared image when the infrared light is higher than the predetermined light amount, and to acquire the normal image when the infrared light is lower than the predetermined light amount.

3. The imaging apparatus according to claim 1,
wherein the controller is configured to generate a synthesized image on the basis of a luminance signal of the infrared image and a color difference signal of the normal image.

4. The imaging apparatus according to claim 3,
wherein the controller is configured to generate a corrected color difference signal by correcting a gain of the color difference signal, and to generate the synthesized image on the basis of the corrected color difference signal and the luminance signal.

5. The imaging apparatus according to claim 4,
wherein the controller is configured to correct the gain of the color difference signal on the basis of an intensity of the luminance signal and an intensity of the color difference signal.

6. The imaging apparatus according to claim 5,
wherein the controller is configured to correct the gain of the color difference signal such that a difference between a value based on an intensity of one or more color difference signals and an intensity of the luminance signal or a ratio of the value based on an intensity of one or more color difference signals to the intensity of the luminance signal falls within a predetermined range.

7. An imaging system comprising:
an imaging apparatus including:
an infrared light source configured to emit infrared light;
an image sensor; and
a controller configured to acquire an infrared image generated by the image sensor when the infrared light is higher than a predetermined light amount, and to acquire a normal image generated by the image sensor when the infrared light is lower than the predetermined light amount, and to generate a synthesized image on the basis of the infrared image and the normal image,
wherein the controller is configured to cause an infrared light source to increase the infrared light to be higher than the predetermined light amount in a first period, and to reduce the infrared light to be lower than the predetermined light amount in a second period different from the first period.

8. The imaging system according to claim 7,
further comprising a white light source configured to emit white light to a range to be captured by the imaging apparatus,
wherein the white light source does not emit the white light when the infrared light is higher than a predetermined light amount, and emits the white light when the infrared light is lower than the predetermined light amount.

9. The imaging system according to claim 7,
further comprising a white light source configured to emit white light to a range to be captured by the imaging apparatus,
wherein the white light source emits the white light continuously.

10. A moving body comprising:
an imaging apparatus including:
an infrared light source configured to emit infrared light;
an image sensor; and
a controller configured to acquire an infrared image generated by the image sensor when the infrared light is higher than a predetermined light amount, to acquire a normal image generated by the image sensor when the infrared light is lower than the predetermined light amount, and to generate a synthesized image on the basis of the infrared image and the normal image,
wherein the controller is configured to cause an infrared light source to increase the infrared light to be higher than the predetermined light amount in a first period, and to reduce the infrared light to be lower than the predetermined light amount in a second period different from the first period.

11. The moving body according to claim 10,
wherein the white light source is capable of irradiating, in a switchable manner, a first irradiation range and a second irradiation range that includes a range vertically above the first irradiation range, and wherein the infrared light source is configured to irradiate the second irradiation range.

12. An imaging method for an imaging apparatus, comprising acquiring an infrared image generated by an image sensor when infrared light is higher than a predetermined light amount;

acquiring a normal image generated by the image sensor when the infrared light is lower than the predetermined light amount;

generating a synthesized image on the basis of the infrared image and the normal image, and causing an infrared light source to increase the infrared light to be higher than the predetermined light amount in a first period, and to reduce the infrared light to be lower than the predetermined light amount in a second period different from the first period.

13. An imaging apparatus comprising:

an image sensor; and a controller configured to acquire an infrared image generated by the image sensor when infrared light is higher than a predetermined light amount, to acquire a normal image generated by the image sensor when the infrared light is lower than the predetermined light amount, and to generate a synthesized image on the basis of the infrared image and the normal image, wherein:

the controller is configured to generate a synthesized image on the basis of a luminance signal of the infrared image and a color difference signal of the normal image, the controller is configured to generate a corrected color difference signal by correcting a gain of the color difference signal, and to generate the synthesized image on the basis of the corrected color difference signal and the luminance signal, the controller is configured to correct the gain of the color difference signal on the basis of an intensity of the luminance signal and an intensity of the color difference signal, and the controller is configured to correct the gain of the color difference signal such that a difference between a value based on an intensity of one or more color difference signals and an intensity of the luminance signal or a ratio of the value based on an intensity of one or more color difference signals to the intensity of the luminance signal falls within a predetermined range.

* * * * *